United States Patent [19]

Moskovich

[11] Patent Number: 4,755,028
[45] Date of Patent: Jul. 5, 1988

[54] PROJECTION LENS WITH AN ASPHERICAL CORRECTOR LENS ELEMENT

[75] Inventor: Jacob Moskovich, Cincinnati, Ohio

[73] Assignee: U.S Precision Lens, Incorporated, Cincinnati, Ohio

[21] Appl. No.: 918,550

[22] Filed: Oct. 14, 1986

[51] Int. Cl.[4] .......................... G02B 3/00; G02B 3/18; G02B 9/34

[52] U.S. Cl. .................................. 350/412; 350/432; 350/469

[58] Field of Search ....................... 350/412, 432, 469

[56] References Cited

U.S. PATENT DOCUMENTS

| | | |
|---|---|---|
| 2,440,088 | 4/1948 | Grey . |
| 2,468,564 | 4/1949 | Luneburg . |
| 2,479,907 | 8/1949 | Cox . |
| 2,502,543 | 4/1950 | Warmisham . |
| 2,552,672 | 5/1951 | Grey . |
| 2,638,034 | 5/1953 | Wreathall . |
| 2,660,094 | 11/1953 | Wreathall . |
| 2,737,849 | 3/1956 | Tiller . |
| 3,429,997 | 2/1969 | Rosner et al. . |
| 3,800,085 | 3/1974 | Ambata et al. . |
| 3,868,173 | 2/1975 | Miles et al. . |
| 3,951,523 | 4/1976 | Nishimoto . |
| 3,998,527 | 12/1976 | Ikeda et al. . |
| 4,300,817 | 11/1981 | Betensky ............................. 350/432 |
| 4,348,081 | 9/1982 | Betensky ............................. 350/432 |
| 4,530,575 | 7/1985 | Yamakawa et al. . |
| 4,548,480 | 10/1985 | Yamamoto et al. . |
| 4,564,269 | 1/1986 | Uejara . |
| 4,577,935 | 3/1986 | Yamakawa et al. . |
| 4,620,773 | 11/1986 | Fukuda ............................. 350/432 |

FOREIGN PATENT DOCUMENTS

| | | |
|---|---|---|
| 57-101812 | 6/1982 | Japan . |
| 57-108815 | 7/1982 | Japan . |
| 57-108818 | 7/1982 | Japan . |
| 57-177115 | 10/1982 | Japan . |
| 58-125007 | 7/1983 | Japan . |
| 58-118616 | 7/1983 | Japan . |
| 58-139110 | 8/1983 | Japan . |
| 58-139111 | 8/1983 | Japan . |
| 58-140708 | 8/1983 | Japan . |
| 59-121016 | 7/1984 | Japan . |
| 59-133517 | 7/1984 | Japan . |
| 59-133518 | 7/1984 | Japan . |
| 593514 | 10/1947 | United Kingdom . |
| 1269133 | 4/1972 | United Kingdom . |

OTHER PUBLICATIONS

Printed Publication-Diagram of a Lens Entitled, Advent Lens Mod II.
Printed Publication-pp. 470-482 of a volume Entitled, A System of Optical Design, by COX.

Primary Examiner—John K. Corbin
Assistant Examiner—Ronald M. Kachmarik
Attorney, Agent, or Firm—Costas & Montgomery

[57] ABSTRACT

A projection lens for a cathode ray tube consisting from the image end of a first lens unit including an element of overall meniscus shape and of positive power at the optical axis, the first lens unit has an object side surface convex to the aperture stop, a second lens unit which consists of a biconvex element and supplies the majority of the positive optical power of the lens, the biconvex element beng of glass and having spheric surfaces, a third lens unit adjacent the cathode ray tube having a strongly concave image side surface and serving as a field flattener, the axial spacing between the first lens unit and said second lens unit also contributing to correction of field curvature, and a corrector lens unit having image side surface convex toward the aperture stop. The surfaces of the first lens unit and the corrector lens unit which are both convex to the aperture stop contribute to correction of sagittal oblique spherical aberration. The corrector unit is axially spaced from the second lens unit a distance such that the axial marginal rays from the second lens unit, as traced from the long conjugate, side intersect the image side surface of the corrector unit at a height from the optical axis that is less than the clear aperture of said corrector lens unit. The corrector lens unit is shaped to correct for off-axis aberrations above the intersection. The first lens unit is of a power which will coverage rays as traced from the long conjugate and thereby reduce the diameter of the second lens unit.

27 Claims, 1 Drawing Sheet

PROJECTION LENS WITH AN ASPHERICAL CORRECTOR LENS ELEMENT

FIELD OF THE INVENTION

This invention relates to projection lenses, and more particularly, relates to projection lenses for cathode ray tubes (CRT) and wide screen television.

BACKGROUND OF THE INVENTION

A preferred form of projection lenses for wide screen television is disclosed in U.S. Pat. Nos. 4,300,817, 4,348,081, and 4,526,442, all assigned to the assignee of the present application.

In these previous patents, the lens units have been referred to as groups which perform specified optical functions. However, in accordance with present United States Patent and Trademark Office requirements, the overall lens will be defined in terms of "lens units". It will be understood that the term "units" refers to one or more optical elements or components air spaced from another optical unit.

It is well known that a specified or defined optical function(s) of a lens unit or group in an overall lens may be accomplished by using one element or component or more than one element or component dependent upon the correction or function desired. A decision as to whether one or more elements is used as a lens unit in an overall lens design may be based on various considerations, including but not limited to, ultimate performance of the lens, ultimate costs of the lens, acceptable size of the lens, etc. Accordingly, in the following specification and appended claims, the term "lens unit" refers to one or more lens elements or lens components which provide a defined optical function or functions in the design of the overall lens.

The lenses disclosed in the aforementioned patents generally comprise three lens units: from the image end a first lens unit, having at least one aspheric surface, which serves as an aberration corrector; a second lens unit including a biconvex element which supplies all or substantially all of the positive power of the lens; and a third lens unit having a concave surface towards the image end of the lens, serving as a field flattener, and essentially correcting any Petzval curvature of the first and/or second groups.

The lenses, as disclosed, are designed for use with a surface of a cathode ray tube (CRT). The lenses of U.S. Pat. No. 4,300,817, utilizing a single biconvex element in the second lens unit, all have an equivalent focal length (EFL) of one hundred twenty-seven millimeters or greater, while the lenses of U.S. Pat. No. 4,348,081, which utilize a two-element second lens unit, including the biconvex element, may have an EFL reduced to eighty-five millimeters as designed for direct projection for a five inch diagonal CRT. The lenses described in U.S. Pat. No. 4,526,442 are designed to have a fold in the optical axis between the first and second lens units and have been designed so that the EFL is as low as one hundred twenty-six millimeters. These EFL's are also for CRT screens having a viewing surface with an approximate five inch diagonal.

Projection TV sets are rather bulky and have required high volume cabinets. One manner of reducing the cabinet size is to decrease the EFL of the projection lenses. This, of course, increases the field angle of the lens.

A further consideration is introduced wherein a spacing is provided between the phosphor screen of the CRT and the third lens unit of the projection lens. This spacing may be required for the inclusion of a liquid cooling and/or optical coupling material and a housing necessary to enclose the coolant against the face of the CRT. This additional spacing between the face of the CRT causes the third negative lens unit to contribute more negative power, which must be compensated by increased power in the positive second lens unit. In some cases, the phosphor surface of the CRT is curved convex to increase the corner brightness. This permits a power reduction in the third group inasmuch as the power requirement for correction of field curvature is reduced.

An effect of increasing the angular coverage of the lens as a result of decreasing the EFL is that the aberrations become more difficult to correct. A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, the EFL may be shortened. However, merely splitting the optical power of the second lens unit into two elements to obtain additional degrees of optical design freedom does not provide acceptable contrast and resolution where the angular coverage of the projection lenses is required to be in excess of twenty-seven degrees, semi-field.

The EFL of the lens is a function of the total conjugate distance between the CRT and the display screen. This is shown by the relationship $$OL = EFL(1 + 1/M) + EFL(1 + M)$$

where OL is the overall conjugate distance of the system from object to image

EFL (1+M) is the distance from the image to the first principal point of the lens EFL (1+1/M) is the distance from the object to the second principal point of the lens and M is the magnification of the system expressed as the ratio of object height to image height.

Therefore, in order to decrease the total distance between the CRT and the screen, it is necessary to reduce the EFL, or alternately stated, increase the field angle of the lens.

Since the advent of lenses, as shown in U.S. Pat. No. 4,300,817, which made large screen home projection television sets feasible, there has been continuing efforts to design projection lenses with wider field angles which are more compact, and easier to manufacture at the greatest economy. This, of course, is an effort to reduce the cost of the lens and reduce the depth of the housing of the television system while maintaining or increasing the size of the viewing screen.

Projection lens of the overall type described have been designed with decreased EFL's by designing a more complex second lens unit split into more than one lens element, as exemplified in the lenses disclosed in co-pending application Ser. Nos. 642,825 and 652,062, filed Aug. 21, 1984 and Sept. 19, 1984, now U.S. Pat. Nos. 4,687,892 and 4,707,684 respectively.

These designs are currently used on many wide screen projection television sets and may have an equivalent focal length as low as eighty millimeters. It will be understood that the EFL will be greater if there is a fold in the optical axis between the first and second lens units.

Co-pending application Ser. No. 776,149, filed Sept. 13, 1985, discloses projection lenses in which the EFL is reduced to less than sixty millimeters for an object height of approximately five inches.

These lenses use a negative first lens unit to aid in correction of field curvature due to the large positive power of the second lens unit and increased field angle. This approach works very well and leads to high quality optical performance of the lens. However, it requires large diameter positive elements in the second lens unit to accommodate the diverging bundle of light (as traced from the long conjugate). This construction also requires a lens of relatively long front vertex distance (FVD) because of the negative first group. The front vertex distance is the distance from the image side of the first lens unit to the face place of the CRT.

In lenses described in U.S. Pat. No. 4,300,817 and the co-pending applications, the power unit elements are often made out of acrylic because of simplicity of manufacturing aspherical surfaces on plastic. However, the refractive index of acrylic varies significantly with the change of temperature. As a result, the focal length of the lens where all the elements are made out of acrylic may vary quite substantially with the change of operating temperature leading to a change of focus and to the degradation of image quality. One way to compensate for the focus shift with temperature is to design a lens mount and a lens barrel using, possibly, a bi-metallic plate or other means that will shift the position of the lens relative to CRT as a function of temperature in such a way that the focus of the lens will remain in a constant position.

Another way of solving the problem of thermal focus shift is to make the power group out of glass because the index of refraction of glass is much more stable with the change of temperature. Consequently, the power of the lens will not be changing by very much and the same will be true for a position of the focus of the lens. However, since making aspherical surfaces on glass is currently much more expensive than on plastic, the reasons of economics limit this glass power unit to having only spherical surfaces. With this limitation, it becomes very difficult to obtain a good optical performance of the lens while, at the same time, maintaining a simple configuration of that lens and still be capable of handling high speed and wide field coverage.

Lenses of the present invention are designed to provide semi-field angles of greater than 30° and, therefore, present unusual concerns in the correction of aberrations.

To reduce the cost of manufacturing projection lenses, it is desirable to decrease the size of the elements. In the present invention, a positive first lens unit is utilized to reduce the diameter of the other elements of the lens. This is achieved through the use of a positive first lens unit preferably in the overall form of a meniscus which converges the rays toward the strongly positive second lens unit (as traced from the long conjugate side). The spacing between the first lens unit and the second lens unit is thereby reduced, which results in a reduction in the front vertex distance of the lens.

The present invention provides a projection lens for projecting a monochromatic CRT onto a large screen, the lens being capable of handling a high speed of at least f/1.0; providing a wide field of view in excess of 30 degrees exhibiting very little focus shift and image quality degradation with the change of operating temperature at which this lens is used; being manufactured very economically and in large numbers using conventional molding technology; and providing high image quality.

SUMMARY OF THE INVENTION

The present invention utilizes a spherical glass element in the second group and adds an aberration correction element having at least one aspheric surface between the second and third lens units. The correction element is of weak optical power and temperature variations do not noticeably affect the focus of the overall lens. The first lens unit and the correction lens unit are both convex to the aperture stop to contribute to correction of sagittal oblique spherical aberration. Moreover, the positioning of the correction element with respect to the second lens unit is such that it permits better correction for aberrations due to off-axis rays. The first lens unit comprises a first lens element having a positive element of overall meniscus shape, which is spaced a predetermined distance from the second lens unit in order to converge the rays (as traced from the long conjugate) and reduce the diameter of the second lens unit, and thus provide a more compact lens. Moreover, the shape of the first lens unit and the corrector element is chosen so that there is minimial deviation in thickness from the axis to the clear aperture. This provides greater accuracy in molding these acrylic elements.

Lens embodying the invention may have semi-field angles of thirty degrees and greater, and are of reduced physical size. For example, a projection lens for a forty-one inch diagonal viewing screen may have an equivalent focal length of 78.0 mm and a front vertex distance as low as 147.7 mm, with 33° semi-field angle.

An object of this invention is to provide a new and improved projection lens of the type described, having a wider field angle and consisting of as little as four lens elements.

Another object of this invention is to provide a more compact lens of the type described.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
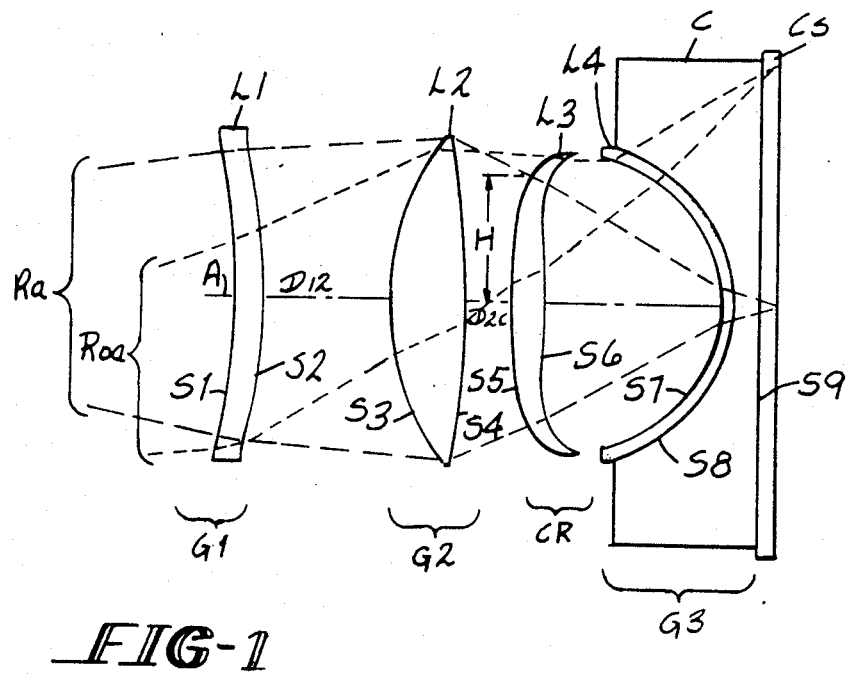
FIGS. 1 and 2 are schematic side elevations of lenses embodying the invention.

Projection lenses embodying the invention are set forth in Tables I-V and exemplified in the drawings.

Figure 2:
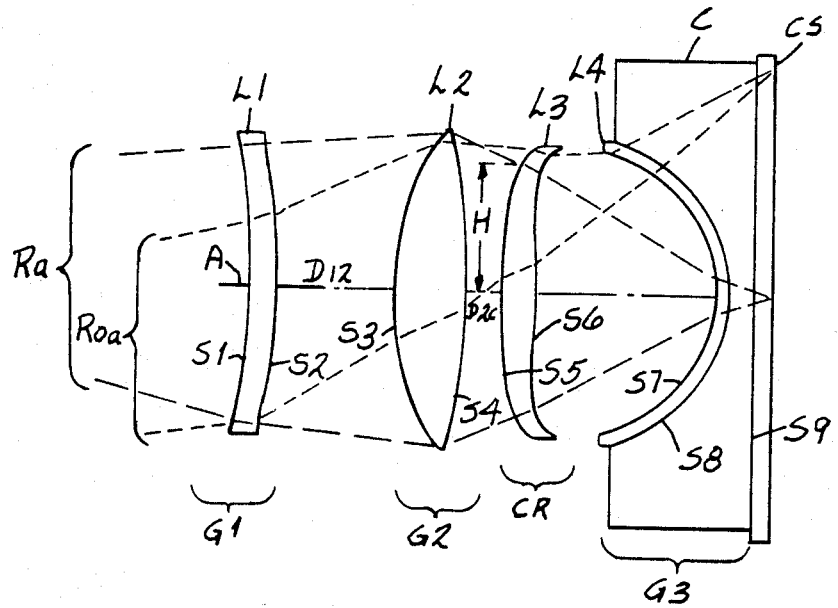

In the drawings, the lens units are identified by the reference G followed by successive arabic numerals except that a corrector lens unit is designated by the reference CR; lens elements are identified by the reference L followed by successive arabic numerals from the image to the object end. Surfaces of the lens elements are identified by the reference S followed by successive arabic numerals from the image to the object end. The reference SC denotes the screen of a cathode ray tube while the reference C denotes a liquid optical coupler between the screen SC and the overall lens. In the embodiments of FIGS. 1 and 2, the coupler C contributes optical power as hereinafter explained.

In all disclosed embodiments of the invention, the first lens unit G1 comprises an element of positive power and an overall positive shaped meniscus, and has at least one aspheric surface defined by the equation $$x = \frac{Cy^2}{1 + \sqrt{1 - (1 + K)C^2y^2}} + Dy^4 + Ey^6 + Fy^8 + Gy^{10} + Hy^{12} + Iy^{14}$$

where x is the surface sag at a semi-aperture distance y from the axis A of the lens, C is the curvature of a lens surface at the optical axis A equal to the reciprocal of the radius of the optical axis, K is a conic constant.

This lens is shown for use with a flat CRT faceplate SC and therefore requires a greater degree of curvature on surface S9 of element L4 for correction of field curvature. The greater the field angle of the lens and the stronger the negative power of the concave surface SP, the greater the amount of sagittal oblique spherical aberration that will be introduced. A lens as shown in FIG. 1 is substantially described in Table I.

The lenses of FIGS. 1 and 2 consist of a first lens unit G1 consisting of element L1 which is spaced a distance $D_{12}$ from a second lens unit G2. Lens unit G2 comprises a biconvex glass element L2. Lens unit G3 comprises an element L4 together with a coupling housing C which contains a fluid which optically couples the faceplate CS of the CRT to the lens. This coupling housing C in conjunction with element L4 contributes optical power to the lens. Element L4 seals the image side surface of coupler C, as described in co-pending Application Ser. No. 820,266 filed Jan. 17, 1986.

A corrector lens unit CR consisting of an element L3 is positioned behind lens unit G2 a distance $D_{2C}$.

Both corrector lens unit CR and lens unit G1 have convex surfaces facing the aperture stop, the position of which is defined in the prescription tables. This arrangement contributes to the correction of sagittal oblique spherical aberration introduced by the wide field angle and the resultant strong curvature on surface S7.

The term "aperture stop", as used herein, refers to the point where the chief rays cross the optical axis A and not the limiting aperture or relative aperture. As thus defined, the aperture stop is closely adjacent or within the thickness of lens unit G2. The position of the aperture stop is set forth for each lens in Tables I–V.

Corrector lens unit CR has the overall shape of a meniscus even though it is biconvex at the optical axis A.

The spacing $D_{12}$ is also chosen to contribute to reduction of field curvature and should not exceed $$0.5 > |D_{12}/F_3| > 0.2$$

where $F_3$ is the equivalent focal length of the third lens unit, as disclosed in co-pending application Ser. No. 899,543 filed Aug. 22, 1986, the same date as this application.

If $|D_{12}/F_3|$ goes below 0.2, the field curvature becomes overcorrected and the image quality is not acceptable. If $|D_{12}/F_3|$ exceeds 0.5, the field curvatuve is undercorrected and the image quality is again not acceptable.

Reference is now made to FIGS. 1 and 2, which show a ray trace from the long conjugate side of axial rays $R_A$ and off-axis rays $R_{OA}$ in a lens embodying the invention.

The lenses of FIGS. 1 and 2 differ very little in appearance, but two figures are set forth to exemplify a point hereinafter discussed.

The element LI of lens unit G1 converges the axial rays $R_A$ within the clear aperture of element L2 of lens unit G2. Element G2 then converges the axial rays $R_A$ to a height H on corrector lens unit L3, which is less than the clear aperture of element L3.

If the axial bundle denoted by rays $R_A$ is held to a height H on element L3 at corrector lens unit CR which is less than the clear aperture of element L3, then the outer dimensions of L3, can be utilized to correct for the off-axis bundle denoted by $R_{OA}$. That is, the designer is given more freedom in correcting other aberrations in the dimension above H. These aberrations may be coma, astigmatism and sagittal oblique spherical. It is well known that the aberrations due to off-axis rays are a function of the clear aperture of a lens element and the angle of incidence. Therefore, the spacing $D_{2C}$ between the second lens unit G2 and the corrector lens unit L3 is selected so that the marginal axial rays $R_A$ converge to a predetermined height H on the correction lens unit. This height H may vary dependent on the shape of the corrector lens unit and the spacing $D_{2C}$ from lens unit G2. The height H as related to one-half the clear aperture CA/2 of the corrector lens unit is preferably in the range of $0.92 \geq 2H/CA \leq 0.5$. The actual height for each of the lenses is set forth in Table VII under the heading Unit C, 2H/CA.

The spacing $D_{2C}$ between the second lens unit G2 and corrector lens unit L3 is $$0.2 > D_{2C}/F_0 > 0.1$$

where $F_0$ is the equivalent focal length of the overall lens.

If $D_{2C}$ becomes too large, the ability to correct aperture dependent aberrations is lost because the height H of the axial ray bundle $R_A$ becomes too low at surface S5.

If $D_{2C}$ becomes too small, H increases, and the ability to influence off-axis aberrations is decreased.

The positive first lens unit G1 together with the overall meniscus shape thereof permits the diameter of the second lens unit G2 to be reduced. This reduction also reduces the height of the marginal rays, permitting a reduction in diameter of the following lens elements.

It will be noted that in all of the lenses of FIGS. 1 and 2 and Tables I–V, the corrector lens unit CR has strong curvatures toward the object side adjacent the clear apertures thereof. This enables the height H to be increased as shown in Table VII. These strong curvatures, in essence, enlarge the clear aperture for the off-axis rays $R_{OA}$ and permit greater aspheric correction above the height H. With this strong curvature of the corrector lens unit CR adjacent the clear apertures thereof, the aberrations due to off-axis rays may be more easily corrected. Such aberrations are astigmatism, coma and sagittal oblique spherical.

It may be noted that the embodiment of FIG. 2 has less curvature adjacent the clear aperture than the embodiments of FIG. 1.

In the lens of FIG. 2 and Tables I, III and IV, the distance $D_{2C}$ decreases and the degree of curvature of the aspheric surfaces adjacent the clear aperture increases to contribute to the correction of aberrations due to off-axis rays.

In the lens of FIG. 1 and Tables II and IV, the degree of curvature of lens unit CR adjacent the clear aperture decreases with the distance $D_{2C}/F_0$.

Thus, the degree of curvature toward lens unit G3 by the corrector lens unit CR is a function of the spacing $D_{2C}/F_0$ between the second lens unit C2 and the corrector lens unit CR. The greater the spacing $D_{2C}/F_0$ the lesser the curvature required on the outer extremities of the corrector lens unit CR towards lens unit G3.

The element L1 has been described as an element of overall meniscus shape. This is true even though the element may be biconvex at the axis, as exemplified in Table III. The aspheric surfaces may lead to an overall meniscus, even though the axial radii specify another shape. The same is true for the corrector lens units CR.

In all cases, the corrector lens units CR are shaped to contribute to correction of spherical aberration in the center and to contribute to correction of off-axis aberrations toward the ends.

In the following Tables I–V, the lens elements are identified from the image end to the object end by the reference L followed successively by an arabic numeral. Lens surfaces are identified by the reference S followed by an arabic numeral successively from the image to the object end. The index of refraction of each lens element is given under the heading $N_D$. The dispersion of each lens element as measured by its Abbe number is given by $V_D$. EFL is the equivalent focal length of the lens and the semi-field angle is set forth. F/No. is the relative aperture of the lens, and the aperture stop is indicated in relation to a surface. The aspheric surfaces of the lens elements are in accordance with the coefficients set forth in the foregoing aspheric equation.

In the lenses of Tables I–V, the optical power of the CRT screen are not set forth since these powers are on the order of ten to the minus fourteenth power.

TABLE I

| Lens | | Surface Radii (mm) | Axial Distance Between Surfaces (mm) | $N_D$ | $V_D$ |
|---|---|---|---|---|---|
| L1 | S1 | −671.234 | | | |
| | | | 8.000 | 1.492 | 57.1 |
| | S2 | −207.481 | | | |
| | | | 32.506 | | |
| L2 | S3 | 73.416 | | | |
| | | | 20.000 | 1.526 | 60.0 |
| | S4 | −205.356 | | | |
| | | | 10.320 | | |
| L3 | S5 | 497.492 | | | |
| | | | 9.000 | 1.492 | 57.1 |
| | S6 | −184.865 | | | |
| | | | 48.788 | | |
| | S7 | −39.698 | | | |
| L4 | | | 3.500 | 1.586 | 34.0 |
| | S8 | −42.000 | | | |
| C | | | 7.000 | 1.432 | 50.0 |
| | S9 | PLANO | | | | f/No. = 1:1.0 at infinity
EFL = 78.18 mm
FVD = 151.57 mm
Semi-Field Angle = 33.24°
Aperture Stop = 30.23 mm after surface S2
Aspheric Surfaces S1, S2, S5, S6, S7

| | S1 | S2 | S5 |
|---|---|---|---|
| D | $-0.2150 \times 10^{-5}$ | $-0.1471 \times 10^{-5}$ | $0.1369 \times 10^{-5}$ |
| E | $0.2969 \times 10^{-9}$ | $0.6231 \times 10^{-9}$ | $0.4434 \times 10^{-9}$ |
| F | $0.4509 \times 10^{-12}$ | $0.3104 \times 10^{-13}$ | $0.4550 \times 10^{-12}$ |
| G | $-0.2485 \times 10^{-15}$ | $0.1427 \times 10^{-15}$ | $0.8954 \times 10^{-16}$ |
| H | $0.1182 \times 10^{-18}$ | $-0.7749 \times 10^{-19}$ | $-0.1127 \times 10^{-18}$ |

TABLE I-continued

| I | $-0.2974 \times 10^{-22}$ | $0.1150 \times 10^{-22}$ | $0.5257 \times 10^{-22}$ |
|---|---|---|---|
| K | | | −1.00 |

| | S6 | S7 |
|---|---|---|
| D | $0.1816 \times 10^{-5}$ | $-0.7748 \times 10^{-5}$ |
| E | $0.9665 \times 10^{-9}$ | $0.1315 \times 10^{-7}$ |
| F | $0.6075 \times 10^{-13}$ | $-0.1146 \times 10^{-10}$ |
| G | $0.2914 \times 10^{-15}$ | $0.6217 \times 10^{-14}$ |
| H | $0.1631 \times 10^{-19}$ | $-0.2791 \times 10^{-17}$ |
| I | $0.1263 \times 10^{-22}$ | $0.8710 \times 10^{-21}$ |
| K | −1.00 | 0.01 |

TABLE II

| Lens | | Surface Radii (mm) | Axial Distance Between Surfaces (mm) | $N_D$ | $V_D$ |
|---|---|---|---|---|---|
| L1 | S1 | −315.328 | | | |
| | | | 8.000 | 1.492 | 57.1 |
| | S2 | −169.809 | | | |
| | | | 35.138 | | |
| L2 | S3 | 70.326 | | | |
| | | | 19.500 | 1.526 | 60.0 |
| | S4 | −270.522 | | | |
| | | | 12.912 | | |
| L3 | S5 | 236.802 | | | |
| | | | 9.000 | 1.492 | 57.1 |
| | S6 | −232.758 | | | |
| | | | 47.919 | | |
| | S7 | −39.507 | | | |
| L4 | | | 3.500 | 1.586 | 34.0 |
| | S8 | −42.000 | | | |
| C | | | 7.000 | 1.417 | 50.0 |
| | S9 | PLANO | | | | f/No. = 1:1.0 at infinity
EFL = 78.03 mm
FVD = 147.71 mm
Semi-Field Angle = 33.26°
Aperture Stop = 0.00 mm after surface S3
Aspheric Surfaces S1, S2, S5, S6, S7

| | S1 | S2 | S5 |
|---|---|---|---|
| D | $-0.1877 \times 10^{-5}$ | $-0.1237 \times 10^{-5}$ | $0.1231 \times 10^{-5}$ |
| E | $0.4169 \times 10^{-9}$ | $0.7071 \times 10^{-9}$ | $0.6586 \times 10^{-9}$ |
| F | $0.4372 \times 10^{-12}$ | $-0.2489 \times 10^{-14}$ | $0.4893 \times 10^{-12}$ |
| G | $-0.2819 \times 10^{-15}$ | $0.1034 \times 10^{-15}$ | $0.1141 \times 10^{-16}$ |
| H | $0.9486 \times 10^{-19}$ | $-0.7923 \times 10^{-19}$ | $-0.1471 \times 10^{-18}$ |
| I | $-0.1511 \times 10^{-22}$ | $0.1838 \times 10^{-22}$ | $0.1252 \times 10^{-21}$ |
| K | | | −1.00 |

| | S6 | S7 |
|---|---|---|
| D | $0.1683 \times 10^{-5}$ | $-0.7644 \times 10^{-5}$ |
| E | $0.1407 \times 10^{-8}$ | $0.1287 \times 10^{-7}$ |
| F | $-0.1069 \times 10^{-13}$ | $-0.1152 \times 10^{-10}$ |
| G | $0.1236 \times 10^{-15}$ | $0.6381 \times 10^{-14}$ |
| H | $0.4008 \times 10^{-19}$ | $-0.2734 \times 10^{-17}$ |
| I | $0.1138 \times 10^{-21}$ | $0.7962 \times 10^{-21}$ |
| K | −1.00 | 0.01 |

TABLE III

| Lens | | Surface Radii (mm) | Axial Distance Between Surfaces (mm) | $N_D$ | $V_D$ |
|---|---|---|---|---|---|
| L1 | S1 | −276.945 | | | |
| | | | 8.000 | 1.492 | 57.1 |
| | S2 | −713.989 | | | |
| | | | 39.544 | | |
| L2 | S3 | 64.09 | | | |
| | | | 21.000 | 1.526 | 60.0 |
| | S4 | −345.419 | | | |
| | | | 8.542 | | |
| L3 | S5 | 281.339 | | | |
| | | | 9.000 | 1.492 | 57.1 |
| | S6 | −243.160 | | | |
| | | | 46.801 | | |
| | S7 | −38.694 | | | |
| L4 | | | 5.000 | 1.586 | 34.0 |
| | S8 | −46.000 | | | |
| C | | | 7.000 | 1.460 | 50.0 |

TABLE III-continued

| | S9 | PLANO | |
|---|---|---|---| f/No. = 1:1.0 at infinity
EFL = 77.88 mm
FVD = 151.56 mm
Semi-Field Angle = 32.97°
Aperture Stop = 36.78 mm after surface S2
Aspheric Surfaces S1, S2, S5, S6, S7

| | S1 | S2 | S5 |
|---|---|---|---|
| D | $-0.1863 \times 10^{-5}$ | $-0.1562 \times 10^{-5}$ | $0.9945 \times 10^{-6}$ |
| E | $-0.2210 \times 10^{-9}$ | $0.3054 \times 10^{-9}$ | $0.8919 \times 10^{-9}$ |
| F | $0.3575 \times 10^{-12}$ | $-0.1572 \times 10^{-12}$ | $0.2028 \times 10^{-12}$ |
| G | $-0.2164 \times 10^{-15}$ | $0.1507 \times 10^{-15}$ | $0.5708 \times 10^{-16}$ |
| H | $0.1158 \times 10^{-18}$ | $-0.3256 \times 10^{-19}$ | $0.1910 \times 10^{-19}$ |
| I | $-0.2149 \times 10^{-22}$ | $0.3603 \times 10^{-22}$ | $0.1193 \times 10^{-23}$ |
| K | | | $-1.00$ |

| | S6 | S7 |
|---|---|---|
| D | $0.1660 \times 10^{-5}$ | $-0.5606 \times 10^{-5}$ |
| E | $0.1445 \times 10^{-8}$ | $0.9556 \times 10^{-8}$ |
| F | $0.7721 \times 10^{-13}$ | $-0.9504 \times 10^{-11}$ |
| G | $0.7461 \times 10^{-16}$ | $0.6372 \times 10^{-14}$ |
| H | $0.1131 \times 10^{-18}$ | $-0.2957 \times 10^{-17}$ |
| I | $0.5590 \times 10^{-22}$ | $0.8632 \times 10^{-21}$ |
| K | $-1.00$ | $0.01$ |

TABLE IV

| Lens | Surface | Surface Radii (mm) | Axial Distance Between Surfaces (mm) | $N_D$ | $V_D$ |
|---|---|---|---|---|---|
| L1 | S1 | $-342.272$ | | | |
| | | | 8.000 | 1.492 | 57.1 |
| | S2 | $-1300.533$ | | | |
| | | | 26.675 | | |
| L2 | S3 | 79.862 | | | |
| | | | 18.000 | 1.586 | 60.0 |
| | S4 | $-148.729$ | | | |
| | | | 10.147 | | |
| L3 | S5 | $-1545.503$ | | | |
| | | | 9.000 | 1.492 | 57.1 |
| | S6 | $-131.419$ | | | |
| | | | 47.810 | | |
| L4 | S7 | $-40.126$ | | | |
| | | | 5.000 | 1.586 | 34.0 |
| | S8 | $-46.000$ | | | |
| C | | | 7.000 | 1.460 | 50.0 |
| | S9 | PLANO | | | | f/No. = 1:1.0 at infinity
EFL = 77.933
FVD = 145.304
Semi-Field angle = 33.26°
Aperture Stop = 26.67 mm after surface S2
Aspheric Surfaces S1, S2, S5, S6, S8

| | S1 | S2 | S5 |
|---|---|---|---|
| D | $-0.1933 \times 10^{-5}$ | $-0.1200 \times 10^{-5}$ | $0.1139 \times 10^{-5}$ |
| E | $0.1477 \times 10^{-10}$ | $0.4307 \times 10^{-9}$ | $0.3019 \times 10^{-9}$ |
| F | $0.4610 \times 10^{-12}$ | $0.1341 \times 10^{-12}$ | $0.6649 \times 10^{-12}$ |
| G | $-0.1130 \times 10^{-15}$ | $0.1925 \times 10^{-15}$ | $0.2967 \times 10^{-16}$ |
| H | $0.4592 \times 10^{-19}$ | $-0.1014 \times 10^{-18}$ | $-0.1866 \times 10^{-18}$ |
| I | $-0.2600 \times 10^{-22}$ | $0.3801 \times 10^{-23}$ | $0.8176 \times 10^{-22}$ |
| K | | | $-1.00$ |

| | S6 | S8 |
|---|---|---|
| D | $-0.1437 \times 10^{-5}$ | $-0.4966 \times 10^{-5}$ |
| E | $0.6644 \times 10^{-9}$ | $0.7321 \times 10^{-8}$ |
| F | $0.4547 \times 10^{-12}$ | $-0.7051 \times 10^{-11}$ |
| G | $0.1300 \times 10^{-15}$ | $0.5634 \times 10^{-14}$ |
| H | $-0.1139 \times 10^{-18}$ | $-0.3447 \times 10^{-17}$ |
| I | $0.7213 \times 10^{-22}$ | $0.1085 \times 10^{-20}$ |
| K | | $0.01$ |

TABLE V

| Lens | Surface | Surface Radii (mm) | Axial Distance Between Surfaces (mm) | $N_D$ | $V_D$ |
|---|---|---|---|---|---|
| L1 | S1 | 2976.160 | | | |
| | | | 8.000 | 1.492 | 57.1 |
| | S2 | $-286.606$ | | | |
| | | | 31.893 | | |
| L2 | S3 | 65.041 | | | |
| | | | 21.000 | 1.526 | 60.0 |
| | S4 | $-272.887$ | | | |
| | | | 6.862 | | |
| L3 | S5 | 469.386 | | | |
| | | | 9.000 | 1.492 | 57.1 |
| | S6 | $-196.786$ | | | |
| | | | 44.813 | | |
| L4 | S7 | $-34.497$ | | | |
| | | | 3.500 | 1.586 | 34.0 |
| | S8 | $-40.200$ | | | |
| C | | | 10.000 | 1.412 | 50.0 |
| | S9 | PLANO | | | | f/No. = 1:1.0 at infinity
EFL = 78.381
FVD = 144.667
Semi-Field Angle = 33.16°
Aperture Stop = 29.66 mm after surface S2
Aspheric Surfaces S1, S2, S5, S6, S7

| | S1 | S2 | S5 |
|---|---|---|---|
| D | $-0.2458 \times 10^{-5}$ | $-0.1856 \times 10^{-5}$ | $0.1478 \times 10^{-5}$ |
| E | $0.1186 \times 10^{-9}$ | $0.5516 \times 10^{-9}$ | $0.8869 \times 10^{-9}$ |
| F | $0.4640 \times 10^{-12}$ | $-0.8511 \times 10^{-14}$ | $0.3815 \times 10^{-12}$ |
| G | $-0.2345 \times 10^{-15}$ | $0.1615 \times 10^{-15}$ | $0.9523 \times 10^{-16}$ |
| H | $0.1320 \times 10^{-18}$ | $-0.5779 \times 10^{-19}$ | $-0.5373 \times 10^{-19}$ |
| I | $-0.3477 \times 10^{-22}$ | $0.3687 \times 10^{-23}$ | $0.5055 \times 10^{-22}$ |
| K | | | $-1.00$ |

| | S6 | S7 |
|---|---|---|
| D | $0.1954 \times 10^{-5}$ | $-0.6038 \times 10^{-5}$ |
| E | $0.1817 \times 10^{-8}$ | $0.9754 \times 10^{-8}$ |
| F | $-0.1999 \times 10^{-12}$ | $-0.9658 \times 10^{-11}$ |
| G | $0.3490 \times 10^{-15}$ | $0.6578 \times 10^{-14}$ |
| H | $0.9004 \times 10^{-19}$ | $-0.3860 \times 10^{-17}$ |
| I | $0.1181 \times 10^{-21}$ | $0.1441 \times 10^{-20}$ |
| K | $-1.00$ | $0.01$ |

Table VI sets forth the ratio of the powers $K_1$, $K_2$, $K_3$ and $K_{CR}$ of each of lens units G1, G2, G3, and corrector lens unit to the power $K_0$ of the overall lens.

TABLE VI

| Lens | $K_1/K_0$ | $K_2/K_0$ | $|K_3/K_0|$ | $K_{CR}/K_0$ |
|---|---|---|---|---|
| TABLE I | .107 | .725 | .817 | .327 |
| TABLE II | .129 | .743 | .830 | .284 |
| TABLE III | .192 | .748 | .920 | .293 |
| TABLE IV | .142 | .771 | .880 | .288 |
| TABLE V | .149 | .772 | .846 | .277 |

It will be noted that the axial power $K_{CR}$ of the corrector lens unit CR is quite small in relation to the overall power $K_0$ of the lens or in relation to the power $K_2$ of the second lens unit G2. The axial power $K_1$ of the group G1 is very small in all cases. Therefore, the effect of temperature on plastic lens units G1 and CR will have little effect on the focus of the lens.

The power ratio of the first lens group is preferably $K_1/K_0 < 0.2$ and the power ratio of the corrector lens unit is preferably $K_0/K_{CR} > 3.0$ Table VII sets forth the absolute ratios of the distance $D_{12}$ to the equivalent focal length $F_3$ of lens unit G3; the ratio of the spacing $D_{12}$ to the equivalent focal length $F_0$ of the lens; and the axial spacing of the corrector lens unit C1 from lens unit G2.

TABLE VII

| Lens | $|D_{12}/F_3|$ | $D_{12}/F_0$ | $D_{2C}/F_0$ | Unit C $2H/CA$ |
|---|---|---|---|---|
| TABLE I | .376 | .449 | .165 | .89 |
| TABLE II | .346 | .427 | .132 | .90 |
| TABLE III | .466 | .564 | .115 | .83 |
| TABLE IV | .335 | .368 | .130 | .89 |
| TABLE V | .344 | .407 | .115 | .92 |

The corrector lens unit CR may be considered to be part of lens unit G2 since it contributes a small amount of positive power even though the spacing is greater than shown in FIG. 2 of U.S. Pat. No. 4,348,081. In all embodiments, the second lens unit G2 is formed of glass to avoid focus shift with temperature variation.

The molded plastic aspheric elements are so shaped that there is minimal variation in thickness as measured parallel to the optical axis. This contributes to greater accuracy in molding these elements.

An important characteristic of these elements is shown in Table VIII where Tmin and Tmax are minimum and maximum thicknesses of these elements, respectively, measures parallel to the optical axis as they change along the diameter of the element.

TABLE VIII

| | Tmax/Tmin | |
|---|---|---|
| Lens | L1 | L3 |
| TABLE I | 1.2 | 1.5 |
| TABLE II | 1.1 | 1.8 |
| TABLE III | 1.5 | 1.5 |
| TABLE IV | 1.2 | 1.8 |
| TABLE V | 1.3 | 1.8 |

Because of the low powers of elements L1 and CR, it is possible to maintain the ratio Tmax/Tmin < 2.5

This means that these elements are very suitable for manufacturing, using conventional injection molding technology. This manufacturing technique can give excellent results at very low cost if lenses to be molded have as small a variation of thickness as possible. This is due to more uniform cooling of the molded elements and smaller deformations caused by non-uniform shrinkage of the plastic lens as it is cooled.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A projection lens for a cathode ray tube display from the image end consisting of a first lens unit of weak optical power having at least one aspheric surface, a second lens unit of overall biconvex shape of glass and having spherical surfaces, a third lens unit having a strongly concave image side and serving as a field flattener, and a corrector lens unit positioned between said second and third lens units and having at least one aspheric surface, said corrector lens unit being axially spaced at least 0.1 of the equivalent focal length of said lens from said second lens unit, said lens having an aperture stop closely adjacent or within the thickness of said second lens unit, said first lens unit consisting of a positive meniscus having an object side surface convex to the aperture stop, said corrector lens unit having an image side surface convex to the aperture stop.

2. The lens of claim 1 where said corrector lens unit has an overall meniscus shape.

3. The lens of claim 2 wherein said corrector lens unit is biconvex at the optical axis of said lens.

4. The lens of claim 1 where said meniscus element is spaced from said second lens element $$0.5 > |D_{12}/F_3| > 0.2$$

where $D_{12}$ is the axial distance between said first and second lens units and $F_3$ is the equivalent focal length of said third lens unit.

5. The lens of claim 1 where said corrector lens unit is biconvex at the optical axis and the object side surface thereof becomes concave adjacent the outer extent of the clear aperture thereof as measured perpendicular to the optical axis of said lens.

6. The lens of claim 1 where said first lens unit and corrector lens unit are single elements and the ratio of the maximum thickness to the minimum thickness of each element is no greater than 2.5, where the thickness is measured parallel to the optical axis of the lens.

7. The lens of claim 1 where said corrector lens unit has an overall meniscus shape.

8. The lens of claim 7 where the object side surface of said corrector lens unit becomes concave adjacent the outer extent of the clear aperture thereof as measured perpendicular to the optical axis of said lens.

9. A projection lens for a cathode ray tube display from the image end consisting of a first lens unit of weak optical power having at least one aspheric surface, a second lens unit of overall biconvex shape of glass and having spherical surfaces, a third lens unit having a strongly concave image side and serving as a field flattener, and a corrector lens unit positioned between said second and third units and having at least one aspheric surface, said corrector lens unit being axially spaced at least 0.1 of the equivalent focal length of said lens from said second lens unit and is biconvex at the optical axis thereof, said lens having an aperture stop closely adjacent or within the thickness of said second lens unit, said first lens unit having an object side surface convex to the aperture stop, said corrector lens unit having an image side surface convex to the aperture stop.

10. The lens of claim 9 where said corrector lens unit is spaced from said second lens element $$0.5 > |D_{12}/F_3| > 0.2$$

where $D_{12}$ is the axial distance between said first and second lens units and $F_3$ is the equivalent focal length of said third lens unit.

11. The lens of claim 9 where said corrector lens unit is biconvex at the optical axis and the object side surface becomes concave adjacent the outer extent of the clear aperture thereof as measured perpendicular to the optical axis of said lens.

12. The lens of claim 9 where said first lens unit and corrector lens unit are single elements and the ratio of the maximum thickness to the minimum thickness of each element is no greater than 2.5, where the thickness is measured parallel to the optical axis of the lens.

13. A projection lens for a cathode ray tube display from the image and consisting of a first lens unit of weak optical power having at least one aspheric surface, a second lens unit of overall biconvex shape of glass and having spherical surfaces, a third lens unit having a strongly concave image side and serving as a field flattener, and a corrector lens unit positioned between said second and third lens units and having at least one aspheric surface, said corrector lens unit being axially spaced at least 0.1 of the equivalent focal length of said lens from said second lens unit, said lens having an aperture stop closely adjacent or within the thickness of said second lens unit, said first lens unit having an object side surface convex to the aperture stop, said corrector lens unit having an image side surface convex to the aperture stop, said first lens element being spaced from said second lens unit $$0.5 > |D_{12}/F_3| > 0.2$$

where $D_{12}$ is the axial distance between said first and second lens units and $F_3$ is the equivalent focal length of said third lens unit.

14. The lens of claim 13 where said corrector lens unit has an overall meniscus shape.

15. The lens of claim 13 where said corrector lens unit is biconvex at the optical axis of said lens.

16. The lens of claim 13 where said corrector lens unit is biconvex at the optical axis and the object side surface thereof becomes concave adjacent the outer extent of the clear aperture thereof as measured perpendicular to the optical axis of said lens.

17. The lens of claim 13 where said first lens unit and corrector lens unit are single elements and the ratio of the maximum thickness to the minimum thickness of each element is no greater than 2.5, where the thickness is measured parallel to the optical axis of the lens.

18. A projection lens for a cathode ray tube display from the image end comprising a first lens element of weak optical power having at least one aspheric surface, a second lens element of overall biconvex shape of glass and having spherical surfaces, a third lens element having at least one aspheric surface, said third lens element being axially spaced at least 0.1 of the equivalent focal length of said lens from said second lens element, and a fourth lens element having a strongly concave image side surface and serving as a field flattener, said lens having an aperture stop closely adjacent or within the thickness of said second lens element, said first lens element being a positive meniscus having an object side surface convex to the aperture stop, said third lens element having an image side surface convex to the aperture stop.

19. The lens of claim 18 where said meniscus element is spaced from said second lens element $$0.5 > |D_{12}/F_3| > 0.2$$

where $D_{12}$ is the axial distance between said first and second lens elements and $F_3$ is the equivalent focal length of said third lens element.

20. The lens of claim 18 where said third lens element has an overall meniscus shape.

21. The lens of claim 20 where said third lens element is biconvex at the optical axis of said lens.

22. The lens of claim 21 where the object side surface of said third lens element becomes concave adjacent the outer edge thereof.

23. A projection lens for a cathode ray tube display from the image end comprising a first lens unit of weak optical power having at least one aspheric surface, a second lens unit of overall biconvex shape of glass and having spherical surfaces, a third lens unit having a strongly concave image side surface and serving as a field flattener, said lens having an aperture stop closely adjacent or within the thickness of said second lens element, and a corrector lens element having at least one aspheric surface, said corrector lens element being axially spaced at least 0.1 of the equivalent focal length of said lens from said second lens unit between said second and third lens units said first lens element being a positive meniscus having an object side surface convex to the aperture stop, said corrector lens element having an image side surface convex to the aperture stop.

24. The lens of claim 23 where said meniscus element is spaced from said second lens unit $$0.5 > |D_{12}/F_3| > 0.2$$

where $D_{12}$ is the axial distance between said first and second lens units and $F_3$ is the equivalent focal length of said third lens unit.

25. The lens of claim 23 where said corrector lens element has an overall meniscus shape.

26. The lens of claim 25 where said corrector lens element is biconvex at the optical axis of said lens.

27. The lens of claim 26 where the object side surface of said corrector lens element becomes concave adjacent the outer edge thereof.

* * * * *